July 26, 1932.   H. DREGHORN   1,869,187
COMMUTATOR TYPE DYNAMO ELECTRIC MACHINE
Filed Feb. 26, 1930
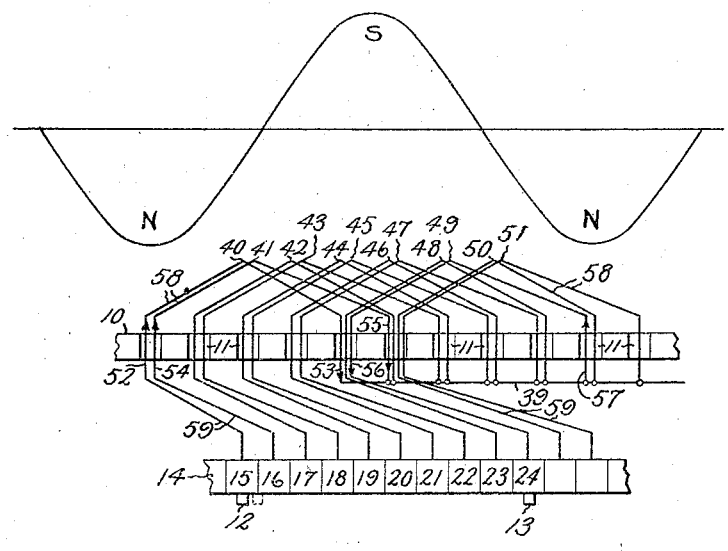
Inventor:
Herbert Dreghorn,
by Charles E. Tullar
His Attorney.

Patented July 26, 1932

1,869,187

UNITED STATES PATENT OFFICE

HERBERT DREGHORN, OF RUGBY, ENGLAND, ASSIGNOR TO GENERAL ELECTRIC COMPANY, A CORPORATION OF NEW YORK

COMMUTATOR TYPE DYNAMO ELECTRIC MACHINE

Application filed February 26, 1930, Serial No. 431,598, and in Great Britain March 5, 1929.

The object of my invention is to improve the commutation of dynamo electric machines employing commutated windings and the principal object of my invention is to improve the commutation of alternating current commutator motors.

It is well known to those skilled in the art that the usual multiplex or simplex direct current armature winding consists of a plurality of closed coils and there are several coils in series between any two consecutive commutator brushes having opposite polarity and the voltages of these several coils aid each other in making up the voltage existing between those two brushes. The voltage between any two adjacent commutator segments will be the voltage of one of its coils and with the full pitch or usual fractional pitch windings this coil will consist of conductors lying in two armature core slots under the influence of opposite magnetic polarities and hence the voltages in these conductors aid each other in making up the voltage between two adjacent commutator segments. The usual direct current machine has a stationary magnetic field and stationary commutator brushes, thus permitting the placing of the brushes so that the slot conductors of the coils short circuited by the brushes will be in the weakest magnetic field possible, namely, about half way between the main poles, thereby reducing the voltage between the adjacent commutator segments short circuited by the brushes and reducing commutation sparking, and in addition this also permits the use of interpoles to further reduce commutation sparking.

Alternating current commutator motors are of two general classes, the brush shifting type and the non-brush shifting type. The alternating current commutator motor has a rotating magnetic field and if the usual armature winding is employed the voltage between the two adjacent commutator segments short circuited by a brush will be the full voltage of one of the coils, thus tending to produce commutation sparking. The non-brush shifting motor has the advantage that its brushes are stationary, thus permitting the use of interpoles to greatly reduce commutation sparking but it also has the disadvantage that it requires expensive and complicated means to vary its excitation and thus vary its speed. The brush shifting motor has the advantage that its speed is varied by simply shifting its brushes but it has the disadvantage that stationary interpoles cannot be used to reduce commutation sparking. Compared with an equal make and physical size of non-brush shifting motor employing interpoles, the brush shifting motor employing the usual armature winding must reduce the magnetic flux density per pole so as to reduce the commutation sparking to an acceptable degree, thus reducing the horse power output per pole and resulting in an uneconomical motor construction. It is therefore desirable to combine the advantages of both types of motor so as to secure a motor whose speed is varied by shifting its brushes and which may be operated with the same or nearly the same magnetic flux density per pole as the non-brush shifting motor employing interpoles and hence with the same or nearly the same horse power output per pole. This combination is highly desirable in high speed, high horse power output alternating current commutator motors since these motors necessarily have few poles and due to their high horse power output must have a high magnetic flux density per pole and especially desirable is this combination where these motors require only a narrow speed regulation, thus not warranting the use of the non-brush shifting motor with its expensive and complicated speed changing means. Examples of high speed, high horse power output motors with narrow speed regulation are those motors which drive centrifugal boiler feed pumps whose speed is varied only in proportion to fluctuations in the boiler steam pressure.

To provide the desired combination, it has hitherto been proposed to employ an armature winding in which the voltages of the coils in series between two consecutive brushes having opposite polarity will aid each other in making up the voltage between the two brushes, whereas the voltage between the two adjacent commutator segments short circuited by a brush is the difference between the nearly equal voltages of two coils in series, thus giving very low voltages between the two adjacent commutator segments. This results in greatly reduced commutation sparking which permits the operation of the brush shifting motor with high magnetic flux density per pole and consequently with high horse power output per pole. The need for my invention and the advantages thereof will be better understood after reading the following brief description of the structure and operation of the two forms of commutated armature winding hitherto proposed. First, a plurality of spaced apart conductors are placed on the armature core with the front end of each conductor connected to the commutator, and the back ends of the conductors connected together. Second, a ring winding consisting of spaced apart coils, each coil having at least two active conductors, with one end of each coil connected to the commutator and the other ends of the coils connected together; or a drum winding consisting of coils having equal winding pitches with each coil having at least one turn and with one end of each coil connected to the commutator and the other ends of the coils connected together. As between the two winding forms, all factors being equal, the first has the advantage of giving the smaller voltage between adjacent commutator segments, because this voltage is the difference between the voltages generated in two adjacent conductors, but it has the disadvantage of not being adapted for use on commercial voltages because each coil has only one active conductor. The second form has the advantage of being adapted for use on commercial voltages because each coil has at least two active conductors, but it has the disadvantage of giving a higher voltage between adjacent commutator segments because the voltage generated in each active conductor of a coil connected to one segment is lower than the voltage generated in the corresponding conductor of a coil connected to the adjacent segment. It was, therefore, desirable to provide a commutated armature winding which has the advantages of both of the winding forms referred to without having their disadvantages, because such a winding will operate on commercial voltages with reduced commutation sparking for a given horse-power output, thus improving the motor operation, or for a given degree of commutation sparking the armature winding will operate with a higher magnetic flux density and consequently a higher horse-power output per pole, thus decreasing the cost of the motor for a given horse-power. This desired commutated armature winding is provided for by my invention, which consists of an armature winding having coils of unequal winding pitches with one end of each coil connected to the commutator and the remaining ends of the coils connected together. Each coil has at least two active conductors, and the corresponding conductors of the coils having different winding pitches are so arranged on the core that the voltage between adjacent commutator segments is the difference between the voltages of two active conductors.

My invention will be best understood from the following description when considered in connection with the accompanying drawing while the features of my invention which are believed to be novel and patentable are pointed out in the appended claims.

The single figure of the drawing represents a development of a portion of a drum type simplex armature winding arranged in accordance with my invention. In the single figure shown, 10 represents an armature core, 11 represents the armature core slots, 12 and 13 represent two brushes resting on the commutator 14, which consists in part of spaced segments 15 to 24, inclusive. Some of the armature coils are represented by 40 to 51 inclusive and to assist in the explanation of my invention I have represented the coil 40 as having the slot conductors 52 and 53, the coil 41 as having the slot conductors 54 and 55, the coil 49 as having the slot conductors 56 and 57, the back end connections are represented by 58 and the front end connections are represented by 59. A conductor 39 connects together a corresponding end of each coil, while the remaining corresponding ends of the coils are connected to the commutator 14 by the front end connections 59. As the motor has a rotating magnetic field, therefore N and S represent some of the exciting poles of the motor in a certain relationship to the armature coils at a certain instant.

The drawing shows an armature having coils of two different winding pitches with each pair of coils of different winding pitches having corresponding slot conductors lying in a common core slot and the other corresponding slot conductors lying in adjacent core slots. For example, coils 40 and 41 have different winding pitches with their corresponding slot conductors 52 and 54 lying in a common core slot and their other corresponding slot conductors 53 and 55 lying in adjacent core slots. Equal voltages will be generated in slot conductors 52 and 54 because they lie in the same core slot, and the same will be true of slot conductors 53 and 56. Also, equal voltages will be generated in slot conductors 52, 54 and 57 because they are cutting equal values of magnetic flux, and the same will be true of slot conductors 53, 55 and 56. But at the instant represented, the voltage generated in slot conductors 52, 54 and 57 will be slightly higher than the voltage generated in slot conductors 53, 55 and 56, because the value of the magnetic flux cut by the former is slightly higher than that cut by the latter. The directions of the voltages generated in these slot conductors at the assumed instant may be represented by the arrowheads shown on them. The voltages generated in the two slot conductors of each coil aid each other. The voltage between brushes 12 and 13 is the sum of the voltages generated in coils 40 and 49. This may be seen by starting from brush 12 and tracing through front end connection 59, slot conductor 52, back end connections 58, slot conductor 53, conductor 39, slot conductor 57, back end connections 58, slot conductor 56, and front end connection 59, to brush 13. It is seen that the voltages in slot conductors 52, 53, 57 and 56 aid each other. If the coils were of equal pitches and were placed on the core in accordance with the prior art, then every two corresponding slot conductors of a pair of coils would lie in adjacent slots; hence, slot conductors 52 and 54 would lie in adjacent slots, and slot conductors 53 and 56 would lie in adjacent slots. The voltage generated between brushes 12 and 13 would be only slightly higher than that with the coils arranged in accordance with my invention as shown in the drawing, and, therefore, my armature winding is suitable for operation on the same voltage as the armature windings of the prior art.

But the important difference between the prior art armature windings and my armature winding is in their respective voltages between adjacent commutator segments. In the prior art armature winding there is a voltage difference between every two corresponding slot conductors of the coils having an end connected to adjacent commutator segments, because every two corresponding slot conductors lie in adjacent core slots, and, therefore, the voltage between adjacent commutator segments is the sum of the two voltage differences of the two sets of corresponding slot conductors. In my armature winding there is no voltage difference between two of the corresponding slot conductors of the coils having an end connected to adjacent commutator segments, because they lie in the same slot, and, therefore, the voltage between adjacent commutator segments is only the voltage difference between the other two corresponding slot conductors lying in adjacent slots. It follows that in my armature winding the voltage between adjacent commutator segments will be one-half of that in the prior art armature winding. The same will be true of the voltage between any two adjacent commutator segments since the coils connected to them have slot conductors lying in a common slot and slot conductors lying in two different slots. It is evident that the use of my armature winding will result in a reduction of commutation sparking with an increase of its attendant advantages.

I have described my invention in connection with a simplex drum type armature winding having one turn per coil with each coil consisting of two slot conductors but it will be evident that my invention is applicable to any form of commutated winding irrespective of the number of turns per coil or slot conductors per turn. Accordingly I desire to have it understood that the embodiments shown are only illustrative of my invention and that such other modifications of my invention as come within its true spirit and scope are intended to be included within the scope of the appended claims.

What I claim as new and desire to secure by Letters Patent of the United States, is:

1. In a dynamo electric machine, the combination with an armature core and a commutator having all of its segments insulated from each other, of an armature winding comprising a plurality of separate coils having a plurality of different pitches, said winding being mounted on said core so that the axes of coils with different pitches follow each other in consecutive order around said core, means for connecting together a corresponding end of each of said coils, and means for connecting the remaining ends of said coils to consecutive commutator segments in the order in which the axes of the coils are located around said core.

2. In a dynamo electric machine, the combination with an armature core having a plurality of slots and a commutator having all of its segments insulated from each other, of an armature winding comprising a plurality of separate coils each containing at least two slot conductors, the slot conductors of said coils being disposed in said slots, so that the pitch of one-half of said coils differs from the pitch of the other half of said coils by the width between adjacent slots of said core and with each slot containing corresponding slot conductors of a coil having one pitch and a coil having the other pitch, means for connecting together a corresponding end of each of said coils, and means for connecting the remaining ends of said coils to consecutive commutator segments in the order in which the axes of the coils are located around said core.

In witness whereof, I have hereunto set my hand this 11th day of February, 1930.

HERBERT DREGHORN.